United States Patent [19]

Funahashi

[11] Patent Number: 5,135,204
[45] Date of Patent: Aug. 4, 1992

[54] DYNAMIC DAMPER

[75] Inventor: Shigeyuki Funahashi, Komaki, Japan

[73] Assignee: Tokai Rubber Industries, Ltd., Komaki, Japan

[21] Appl. No.: 552,225

[22] Filed: Jul. 13, 1990

[30] Foreign Application Priority Data

Jul. 14, 1989 [JP] Japan .................................. 1-183458

[51] Int. Cl.$^5$ ............................................. F16F 15/12
[52] U.S. Cl. .................................. 267/141.4; 188/379; 267/140.5; 464/179
[58] Field of Search ................. 464/179, 180; 188/378, 188/379, 380; 267/140.1, 141.1, 141.2, 141.3, 141.4, 141.5

[56] References Cited

U.S. PATENT DOCUMENTS

| 2,719,017 | 9/1955 | Mordarski et al. | 267/141.5 |
| 3,128,978 | 4/1964 | Sykes | 267/140.4 |
| 3,819,168 | 6/1974 | Nittinger et al. | 267/141.4 X |
| 4,734,079 | 3/1988 | Viets | 188/379 |
| 4,811,933 | 3/1989 | Inagaki et al. | 267/140.5 |

FOREIGN PATENT DOCUMENTS

| 356917 | 3/1990 | European Pat. Off. |
| 1800960 | 4/1969 | Fed. Rep. of Germany . |
| 1352384 | 5/1974 | United Kingdom . |

Primary Examiner—Matthew C. Graham
Attorney, Agent, or Firm—Fleit, Jacobson, Cohn, Price, Holman & Stern

[57] ABSTRACT

A dynamic damper to be mounted on a rotary shaft, such as the drive shaft or a propeller shaft of an automobile, to damp detrimental vibrations generated as the rotary shaft rotates. The dynamic damper is of a sectional type comprising a first end unit, a second end unit and a mass member. The first and second end units are mounted on the rotary shaft opposite to each other, and the mass member is joined fixedly at its opposite ends to the first and second end units. Each of the first and second end units comprises an elastic member integrally having a holding portion which holds to the rotary shaft and a flange portion radially extending from the holding portion, and a holding member fixedly joined to the outer circumference of the flange portion of the elastic member. The first and second end units, and the mass member selected from among those having different dimensions and characteristics are assembled to provide a dynamic damper having a characteristic frequency appropriate for damping the specific detrimental vibrations of the rotary shaft.

4 Claims, 3 Drawing Sheets

DYNAMIC DAMPER

BACKGROUND OF THE INVENTION

1. Field of the Invention

The present invention relates to a dynamic damper to be mounted on a rotary shaft, such as the drive shaft or propeller shaft of an automobile, to damp detrimental vibrations generated as the rotary shaft rotates, such as naturally undesirable bending and torsional vibrations.

2. Description of the Prior Art

As shown in FIG. 7, a conventional, generally used dynamic damper comprises an elastic member 100 fixedly mounted on a rotary shaft S, and a tubular mass member 200 combined integrally with the elastic member 100 and having an inside diameter greater than the outside diameter of the rotary shaft S. The elastic member 100 has two tubular holding portions 101 and two elastic, radially extending end portions 102 integrally combined respectively with the tubular holding portions 101. The spring constant of the elastic member 100 is adjusted properly by selectively determining its quality of shape or the mass and/or the mass member 200 is determined selectively to adjust the characteristic frequency of the elastic member 100 to the frequency of the principal detrimental vibration. Thus, the detrimental vibrations of the rotary shaft S are damped by converting the vibrational energy of the rotary shaft S into that of the dynamic damper by the agency of resonance.

Since the frequency of the principal detrimental vibration is dependent on the construction and rotating speed of the rotary shaft, and the conventional dynamic damper is provided integrally with the elastic member and the mass member, dynamic dampers of different specifications must be manufactured for application to various kinds of rotary shafts. That is, having only a single characteristic frequency corresponding to the frequency of a single detrimental vibration, the conventional dynamic damper is function effectively merely for damping a single detrimental vibration. Accordingly, various dynamic dampers respectively for damping various detrimental vibrations must be manufactured for use in combination with different rotary shafts. However, the preparation of materials of different compositions for forming elastic members respectively having different characteristics and the formation of the elastic members respectively in different shapes require troublesome work and much time and labor, and the mass member of the conventional dynamic damper is liable to obstruct the removal of the dynamic damper from the mold after vulcanization, which is disadvantageous in respect of mass production of dynamic dampers. Thus, the conventional dynamic damper has difficulties in its application to damping various kinds of detrimental vibrations.

SUMMARY OF THE INVENTION

Accordingly, it is an object of the present invention to provide a dynamic damper of a construction capable of readily dealing with various detrimental vibrations for damping.

In one aspect of the present invention, a dynamic damper comprises:

a first end unit comprising a first elastic member integrally having a tubular first holding portion which holds to the outer circumference of a rotary shaft and a first flange portion, and a first holding member combined integrally with the first elastic member;

a second end unit comprising a second elastic member integrally having a tubular second holding portion which holds to the outer circumference of the rotary shaft and a second flange portion, and a second holding member combined integrally with the second elastic member; and a tubular mass member having an inside diameter greater than the outside diameter of the shaft, and having opposite ends fixed respectively to the first and second holding members.

The first holding portion (the second holding portion) may be provided in its outer circumference with an annular groove for receiving a fastening band for fastening the first holding portion (the second holding portion) to the rotary shaft, such as the drive shaft of an automobile. The fastening band may be formed of a stainless steel or the like. The first holding member (the second holding member) is joined integrally to the circumference of the first flange portion (the second flange portion). The first end unit (the second end unit) comprising the first elastic member (second elastic member) having the first holding portion and the first flange portion (the second holding portion and the second flange portion), and the first holding member (the second holding member) may be formed through an insert molding process and a vulcanizing process. The first holding member (the second holding member) may be attached adhesively to the circumference of the first flange portion (the second flange portion) after vulcanizing the first elastic member (the second elastic member). The first and second end units may be the same or different in construction.

The mass member may be formed of a metal.

The dynamic damper in accordance with the present invention is completed by assembling the separately manufactured first and second end units and the mass member before mounting the dynamic damper on the rotary shaft or the dynamic damper may be assembled on the rotary shaft.

A dynamic damper capable of effectively functioning for damping detrimental vibrations of a particular rotary shaft can be obtained by assembling the components including at least one component selected from among those having different characteristics, and hence dynamic dampers of different damping characteristics need not be manufactured. The individual molding and vulcanization of the first and second end units facilitates the manufacture of the first and second end units.

The employment of a first end unit and a second end unit which are different in spring constant from each other enables the dynamic damper to damp two different kinds of detrimental vibrations. The employment of a first end unit and a second end unit which are the same in construction and in characteristics improves the efficiency of the manufacturing process and reduces the cost of dynamic dampers.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Figure 1:
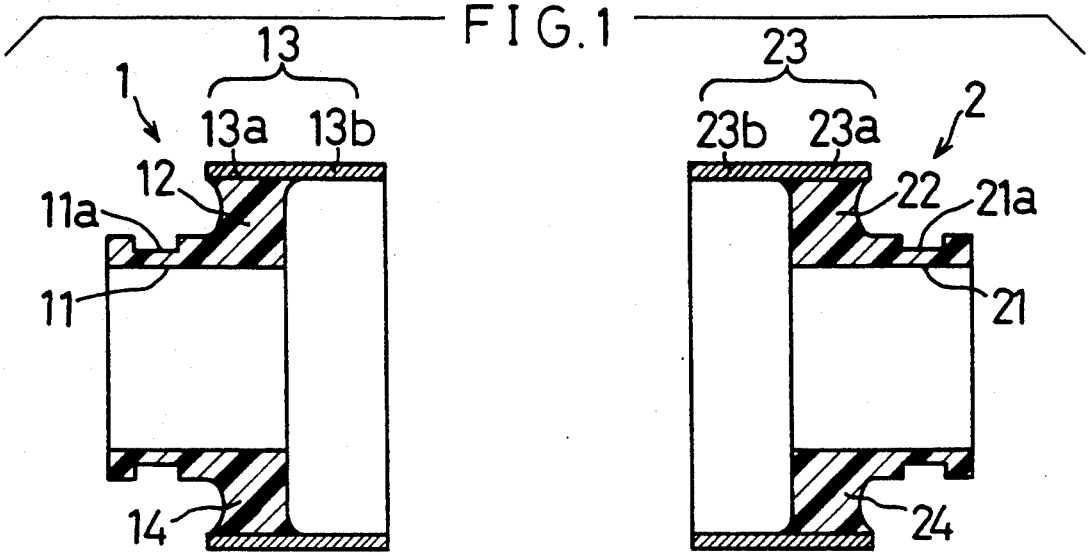
FIG. 1 is a longitudinal sectional view of first and second end unit included in a dynamic damper in a first embodiment according to the present invention.
Figure 2:
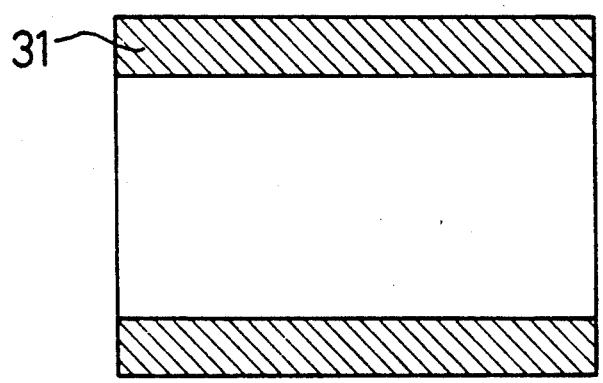
FIG. 2 is a longitudinal sectional view of a mass member included in the dynamic damper in the first embodiment.
Figure 3:
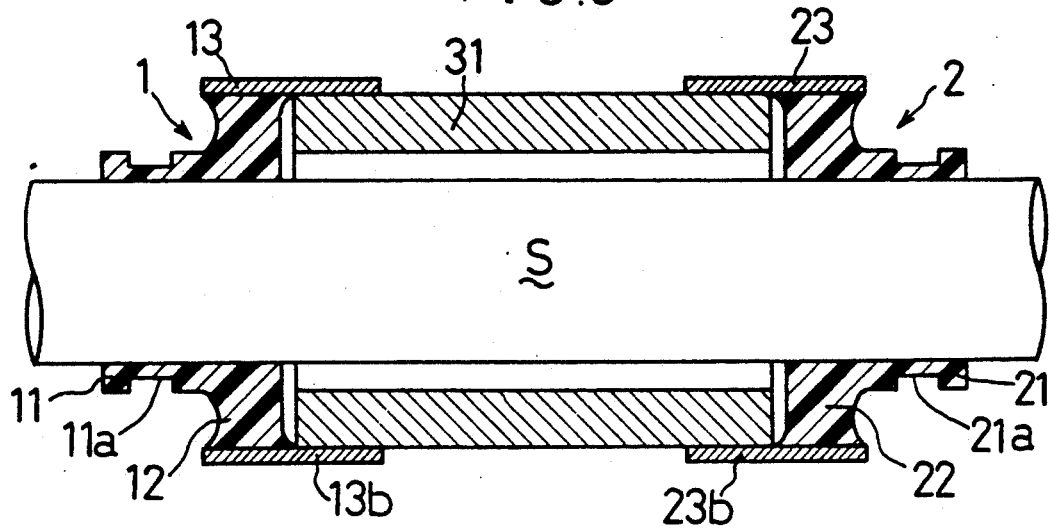
FIG. 3 is a longitudinal sectional view of the dynamic damper in the first embodiment as mounted on a rotary shaft.

First Embodiment (FIGS. 1, 2 and 3)

A dynamic damper in a first embodiment according to the present invention is intended for damping vibrations of the drive shaft of a automobile. The dynamic damper comprises a first end unit 1, a second end unit 2 and a mass member 31.

As shown in FIG. 1, the first end unit 1 comprises a first elastic member 14 integrally having a tubular first holding portion 11 and a first flange portion 12, and a first holding member 13 fixed to the outer circumference of the first flange portion 12 of the first elastic member 14. The first elastic member 14 is formed by molding and vulcanizing natural rubber. The inside diameter of the first holding portion 11 is slightly smaller than the outside diameter of the drive shaft S. An annular groove 11a is formed in the outer circumference of the first holding portion 11 to receive a fastening band, not shown, therein. The first holding member 13 is formed of a metal in the shape of a ring and has a fixing portion 13a fixed to the outer circumference of the first flange portion 12, and a holding portion 13b axially extending from the fixing portion 13a. The inside diameter of the holding portion 13b is slightly smaller than the outside diameter of the mass member 31.

The second end unit 2 is identical with the first end unit 1. The second end unit 2 comprises a second elastic member 24 integrally having a tubular second holding portion 21 and a second flange portion 22, and a second holding member 23 fixed to the outer circumference of the second flange portion 22 of the second elastic member 24. The second holding portion 21 is provided in its outer circumference with an annular groove 21a. The second holding member 23 is formed of a metal in the shape of a ring and has a fixing portion 23a and a holding portion 23b.

The first end unit 1 (the second end unit 2) is fabricated by an insert molding process, in which the first holding member 13 (the second holding member 23) is inserted in the mold, and a vulcanizing process. The first end unit 1 and the second end unit 2 are fabricated individually and independently of the mass member 31.

As shown in FIG. 2, the mass member 31 is a thickwall steel tube or the like having an inside diameter greater than the outside diameter of the drive shaft S.

The first end unit 1, the second end unit 2 and the mass member 31, which are fabricated separately, are assembled by pressing the opposite ends of the mass member 31 respectively into the first holding portion 13b of the first holding member 13 and the second holding portion 23b of the second holding ember 23. The dynamic damper thus completed is mounted on the drive shaft S as shown in FIG. 3. The first end unit 1, the second end unit 2 and the mass member 31 are selected from among those respectively having different dynamic properties so that the dynamic damper has a characteristic frequency appropriate to damping the specific detrimental vibrations of the drive shaft S.

Figure 4:
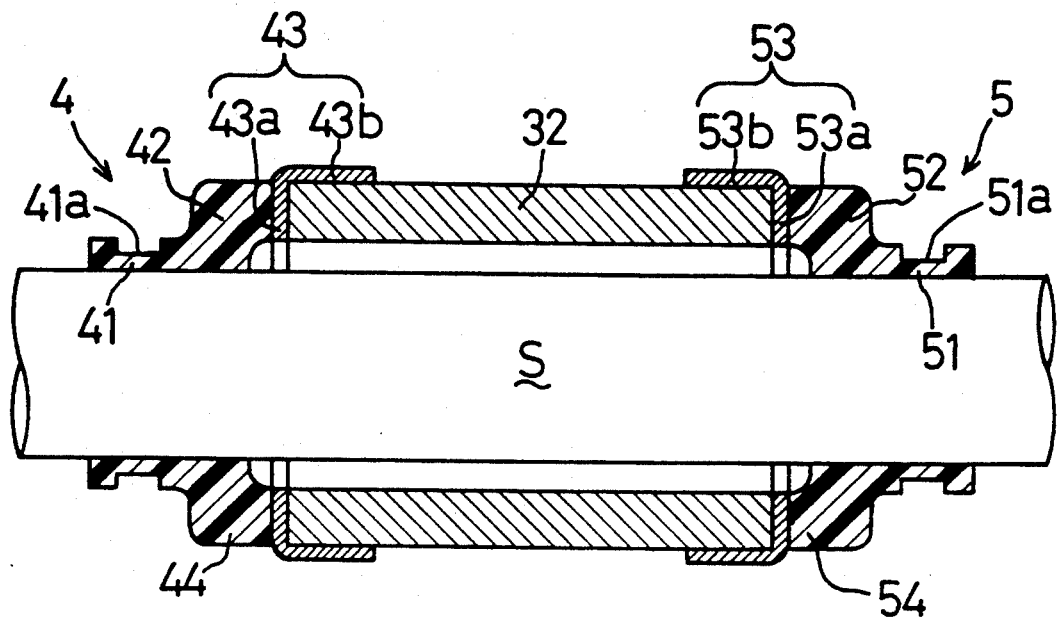
FIG. 4 is a longitudinal sectional view of a dynamic damper in a second embodiment according to the present invention as mounted on a rotary shaft.

Second Embodiment (FIG. 4)

A dynamic damper in a second embodiment according to the present invention employs first and second end units which are different in shape from those of the dynamic damper in the first embodiment.

Referring to FIG. 4, the dynamic damper comprises a first end unit 4, a second end unit 5 and a mass member 32.

The first end unit 4 comprises the first elastic member 44 integrally having a first holding portion 41 and a first flange portion 42, and a first holding member 43. The first holding portion 41 is provided in its outer circumference with an annular groove 41a for receiving a fastening band, not shown, therein. The first holding member 43 is formed of a metal in the shape of a cup consisting of a fixing portion 43a fixed to the end surface of the first flange portion 42, and a holding portion 43b axially extending from the first fixing portion 43a.

The second end unit 5 is identical with the first end unit 4. The second end unit 5 comprises a second elastic member 54 integrally having a second holding portion 51 and a second flange portion 52, and a second holding member 53. The second holding portion 51 is provided in its outer circumference with an annular groove 51a for receiving a fastening band, not shown, therein. The second holding member 53 is formed of a metal in the shape of a cup and has a fixing portion 53a and a holding portion 53b. The mass member 32 is fixed to the respective holding portions 43b and 53b of the first holding member 43 and the second holding member 53 to assemble the dynamic damper.

Figure 5:
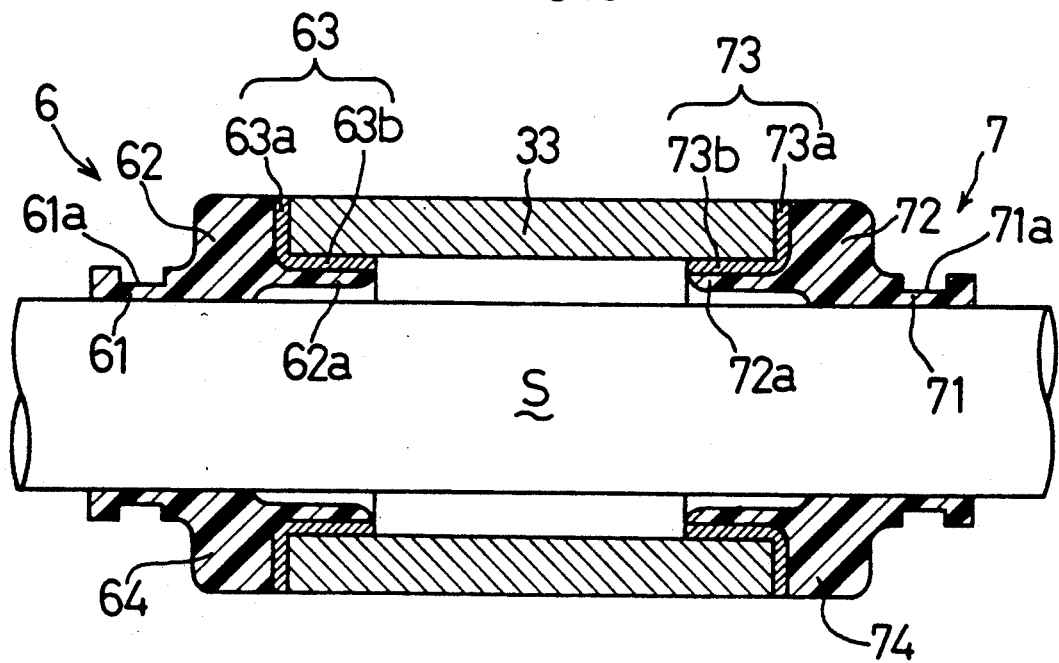
FIG. 5 is a longitudinal sectional view of a dynamic damper in a third embodiment according to the present invention as mounted on a rotary shaft.

Third Embodiment (FIG. 5)

A dynamic damper in a third embodiment according to the present invention employs first and second end units which are different in shape from those of the dynamic damper in the second embodiment.

Referring to FIG. 5, the dynamic damper comprises a first end unit 6, a second end unit 7 and a mass member 33.

The first end unit 6 comprises a first elastic member 64 having a first holding portion 61, a first flange portion 62 and a first tubular projection 62a axially projecting from the end surface of the first flange portion 62, and a first holding member 63. The first holding portion 61 is provided in its outer circumference with an annular groove 61a for receiving a fastening band, not shown, therein. The first holding member 63 is formed of a metal in the shape of a flanged tube having a flange-like fixing portion 63a joined to the end surface of the first flange portion 62 of the first elastic member 64, and a first tubular holding portion 63b fixedly put on the first tubular projection 62a.

The second end unit 7 is identical with the first end unit 6. The second end unit 7 comprises a second elastic member 74 integrally having a second holding portion 71, a second flange portion 72 and a second tubular projection 72a axially projecting from the end surface of the second flange portion 72, and a second holding member 73. The second holding portion is provided in its outer circumference with an annular groove 71a to receive a fastening band, not shown, therein. The second holding member 73 is formed of a metal in the shape of a flanged tube having a flangelike fixing portion 73a fixedly joined to the end surface of the second flange portion 72 of the second elastic member 74, and a second tubular holding portion 73b fixedly put on the second tubular projection 72a.

The mass member 33 is held fixedly at its opposite ends to the respective holding portions 63b and 73b of the first holding member 63 and the second holding member 73.

The respective tubular projections 62a and 72a of the first elastic member 64 and the second elastic member 74 prevents the interference of the mass member 33 with the drive shaft S.

Figure 6:
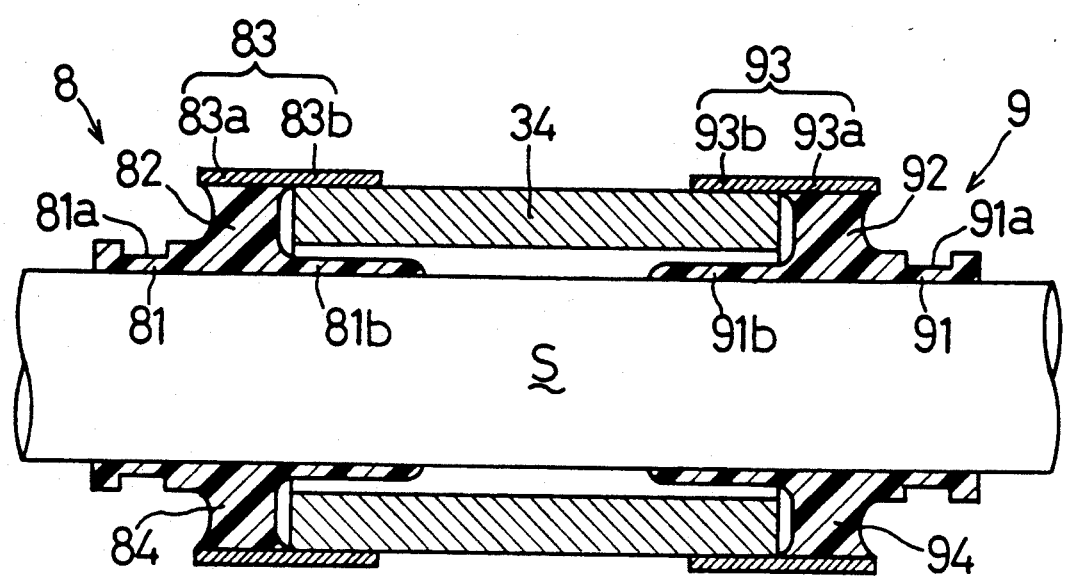
FIG. 6 is a longitudinal sectional view of a dynamic damper in a fourth embodiment according to the present invention.
Figure 7:
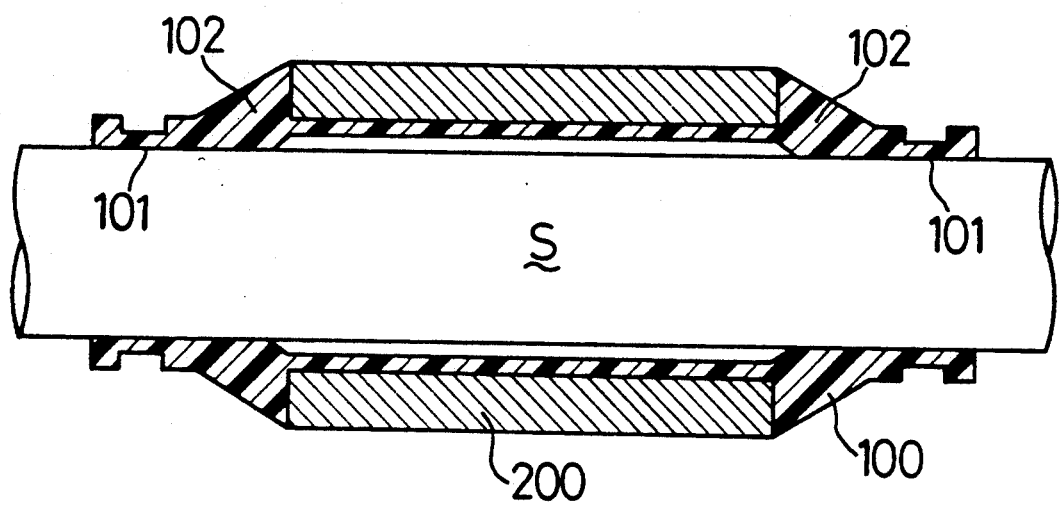
FIG. 7 is a longitudinal sectional view of a conventional dynamic damper as mounted on a rotary shaft.

Fourth Embodiment (FIG. 6)

A dynamic damper in a fourth embodiment according to the present invention is similar in construction to the dynamic damper in the first embodiment, except that the dynamic damper in the fourth embodiment employs first and second elastic members which are different in shape from those of the dynamic damper in the first embodiment.

Referring to FIG. 6, a first end unit 8 comprises a first elastic member 84 integrally having a first holding portion 81, a first flange portion 82 and a first tubular projection 81b axially projecting from the end surface of the first flange portion 82, and a holding member 83. The first holding portion 81 is provided in its outer circumference with an annular groove 81a to receive a fastening band, not shown, therein. The first holding member 83 is formed of a metal in the shape of a tube having a fixing portion 83a fixedly joined to the circumference of the first flange portion 82 of the first elastic member 84, and a holding portion 83b.

A second end unit 9 is identical with the first end unit 8. The second end unit 9 comprises a second elastic member 94 integrally having a second holding portion 91, a second flange portion 92 and a second tubular projection 91b axially projecting from the end surface of the second flange portion 92, and a second holding member 93. The second holding member 93 is formed of a metal in the shape of a tube having a fixing portion 93a fixedly joined to the circumference of the second flange portion 92 of the second elastic member 94, and a holding portion 93b. The mass member 34 is joined at its opposite ends to the respective holding portions 83b and 93b of the first holding member 83 and the second holding member 93.

The tubular projections 81b and 91b prevent the interference of the mass member 34 with the shaft S.

The first and second end units and the mass member respectively having desired dimensions are used selectively according to the specific detrimental vibrations of the objective drive shaft. When the mass member is replaced with another mass member differing from the former in length to adjust the characteristic frequency of the dynamic damper, the distance between the end units is changed.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. A dynamic damper for damping the detrimental vibrations of a rotating shaft, comprising a set of the following separately manufactured components:
   a mass member having an inside diameter greater than the outside diameter of the shaft;
   a first end unit for mounting on the shaft, comprising a first elastic member adapted for being held on the shaft for damping the detrimental vibrations of the rotating shaft together with the mass member and a first substantially tubular holding member adapted for holding a first end of the mass member; and
   a second end unit for mounting on the shaft opposite to and at a distance from the first end unit, comprising a second elastic member adapted for being held on the shaft for damping the detrimental vibrations of the rotating shaft together with the mass member and a substantially tubular holding member adapted for holding a second end of the mass member;
   whereby said mass member, said first end unit and said second end unit are selected independently and assembled together on the shaft to enable damping of various types of detrimental vibrations of the rotating shaft.

2. A dynamic damper according to claim 1, wherein the first and second elastic members each integrally comprise a tubular holding portion for being held on the shaft and each provided with an annular groove in its outer circumference to receive a fastening band therein, and a flange portion radially extending from the holding portion adapted for damping the detrimental vibrations of the rotating shaft together with the mass member, and the first and second holding members each integrally comprise a fixing portion fixed to the outer circumference of the corresponding flange portion of the first and second elastic members, and a holding portion to which the corresponding end of the mass member is joined fixedly.

3. A dynamic damper according to claim 1, wherein the first and second elastic members each integrally comprise a tubular holding portion for being held on the shaft and provided with an annular groove in its outer circumference to receive a fastening band therein, a flange portion adapted for damping the detrimental vibrations of the rotating shaft together with the mass member and radially extending from the holding portion, and a tubular projection adapted for preventing the interference of the mass member with the rotating shaft, the tubular projection axially extending from the end surface of the flange portion, and the first and second holding members each integrally comprising a flange-like fixing portion fixedly joined to the end surface of the corresponding flange portion of the first and second elastic members, and a tubular holding portion adapted for holding the corresponding end of the mass member and fixedly put on the corresponding tubular projection of the first and second elastic members.

4. A dynamic damper according to any one of claims 1 to 3, wherein the elastic members are formed of an elastic material, the holding member is formed of a metal, and the mass member is formed of a metal.

* * * * *

UNITED STATES PATENT AND TRADEMARK OFFICE
CERTIFICATE OF CORRECTION

PATENT NO. : 5,135,204
DATED : August 4, 1992
INVENTOR(S) : Shigeyuki FUNAHASHI

It is certified that error appears in the above-identified patent and that said Letters Patent is hereby corrected as shown below:

Column 3, line 24, "a" should read --an--; and

Column 6, line 22, "a substantially" should read --a second substantially--.

Signed and Sealed this

Thirty-first Day of August, 1993

*Attest:*

BRUCE LEHMAN

*Attesting Officer*     *Commissioner of Patents and Trademarks*